May 19, 1925.

J. GANE

COUPLING CONNECTION TO HOSE PIPES

Filed April 30, 1924

1,538,395

Inventor
John Gane.

By Albert E Dietrich
Attorney

Patented May 19, 1925.

1,538,395

UNITED STATES PATENT OFFICE.

JOHN GANE, OF VANCOUVER, BRITISH COLUMBIA, CANADA.

COUPLING CONNECTION TO HOSE PIPES.

Application filed April 30, 1924. Serial No. 710,162.

*To all whom it may concern:*

Be it known that I, JOHN GANE, citizen of the Dominion of Canada, residing at Vancouver, in the Province of British Columbia, Canada, have invented certain new and useful Improvements in Coupling Connections to Hose Pipes, of which the following is a specification.

This invention relates to a means for securing the male and female portions of a union coupling to a flexible hose-pipe, such as is used for the conveyance of gasolene or the like.

Great difficulty is experienced not in making the union connection itself gasolene-tight, but in making tight the connection of the hose-pipe to the parts of the union.

In the device, which forms the subject of this application, both the male and female parts of the coupling have a tubular portion which projects within the hose-pipe, and a gland screw which is segmentally split that when screwed within a slight taper of that portion of the union from which the tubular portion projects, contracts the end of the hose-pipe on the tubular portion and simultaneously compresses a sealing material in the joint, thereby making an effective gasolene-tight joint that can be quickly applied without the requirement of the special appliances of a workshop such as is usual.

Figure 1:
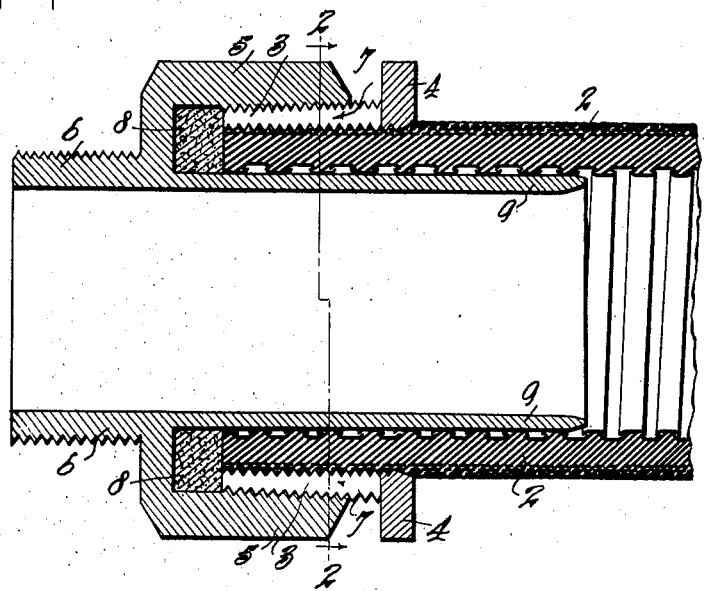
Figure 2:
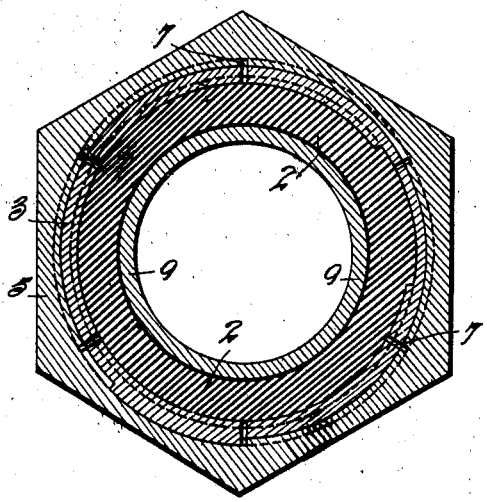

The invention is fully described in the following specification, reference being made to the drawings by which it is accompanied, in which: Fig. 1 is a vertical longitudinal section through the connection, and Fig. 2 is a cross section on the line 2—2 in Fig. 1.

In these drawings 2 represents a flexible hose-pipe, such as is used for the conveyance of gasolene which is usually constructed of a flexible metal coil with a thick layer of rubber protected on the outer side with cotton fabric.

On the square cut end of this hose is applied a gland screw 3 having a hexagon head 4, which screw is internally threaded that it may be screwed on the hose-pipe 2 and is externally threaded with a slight taper to fit an internally threaded member 5 forming a part of the union connection 6. The screw 3 is radially split, as at 7, that when screwed tightly into 5, the several split segments will by the taper be contracted tightly on the hose-pipe 2.

The length of the screwed portion 3 is less than the recess of 5 in which it is screwed, to leave a space for the reception of a sealing cement 8 of asbestos fibre and litharge.

Secured to or integral with the member 5 and projecting axially for a substantial distance beyond the end of 5 is a tubular portion 9, adapted to closely fit within the metal lining of the hose-pipe 2 and to reinforce the pipe beyond its connection to the screw 3, 4.

When the tubular portion 9 of the member 5 is inserted in the end of the hose-pipe on which the gland screw 3, 4 has been applied and is screwed upon the outer side of 3, the taper of the screwing compresses the segments of 3 tightly on the hose-pipe and consequently the hose-pipe tightly on the tubular projection 9. At the same time the cementing material in the space 8 is compressed into any interstices between the hose-pipe 2 and the tubular projection 9 and therefore effectively seals the connection against leakage outward through the splits 7 of the screw 3. The result is an effective gasolene-tight connection that can be quickly made and is relatively permanent in its tightness.

Further, the hose-pipe is reinforced internally adjacent its connection to the rigid union.

Attention is drawn to the following advantageous features in this construction:

That the tubular portion fits easily in the hose-pipe 2; that it can be applied by hand, and is tight thereon by the tapered and split gland screw 3, which screw simultaneously compresses the cementing material 8 to seal all interstices through which the gasoline might leak; and that the tubular portion 9 extends well beyond the end of the union connection and not only reinforce it thereat, but supports the cemented joint against any flexure that would tend to crack the cement.

That these several features are interdependent and together make for the absolute security of the connection.

As the internal nipple portion is smooth and uniformly cylindrical the nipple is adapted for use with internally armored hose, whereas the old devices of the prior art are not so adaptable.

Having now particularly described my invention, I hereby declare that what I claim as new and desire to be protected in by Letters Patent, is:

1. A means for securing a coupling connection to the end of a internally armored hose-pipe, said means comprising, the combination with a coupling member having at one end a male or female coupling connection and at the other end a portion internally tapered and screw-threaded, and concentric therewith a smooth and uniformly cylindrical tubular portion adapted to tightly fit the inside of the hose-pipe and extending from the inner end of the threaded recess to beyond the outer end of the same, a sleeve fitting the outside of the hose-pipe and threaded externally to fit the tapered and threaded portion of the coupling connection to a short distance from its inner end, the threaded portion of this sleeve being radially slit to divide it into a series of flexible segments.

2. A means for securing a coupling connection to the end of a internally armored hose-pipe, said means comprising the combination with a member having a male or female coupling connection at one end and at the other end a hexagonal portion having an internal tapered screw and projecting from the inner end of this threaded recess and concentric therewith a smooth and uniformly cylindrical tubular portion adapted to fit within the end of the hose-pipe and extend considerably beyond the outer end of the threaded recess, a hexagon headed sleeve threaded internally to fit on the hose-pipe and externally tapered and screw threaded to fit the internally threaded portion of the coupling connection, said sleeve having a series of radial slits from the inner end to the head.

3. A means for securing a coupling connection to the end of a internally armored hose-pipe, said means comprising the combination with a member having a male or female coupling connection at one end and at the other end a hexagonal portion internally tapered and screw threaded and axially projecting from the inner end of this threaded recess and concentric therewith a smooth and uniformly cylindrical tubular portion adapted to fit within the end of the hose-pipe, a headed sleeve tightly fitting the outside of the hose-pipe and externally threaded to fit the tapered and threaded portion of the coupling connection to a short distance from its inner end, the threaded portion of this sleeve being radially slit at intervals apart to divide it into a series of flexible segments and a suitable cement filling the space between the end of the hose-pipe and its gland screw, and the bottom of the recess in which they fit.

In testimony whereof I affix my signature.

JOHN GANE.